United States Patent [19]

Singer

[11] E Patent Number: Re. 33,124

[45] Reissued Date of Patent: Dec. 5, 1989

[54] WATER-BASED INDUSTRIAL FLUIDS

[75] Inventor: Haimi N. Singer, Sandton, South Africa

[73] Assignee: Singer and Hersch Industrial Development (PTY) Ltd., South Africa

[21] Appl. No.: 907,145

[22] Filed: Sep. 12, 1986

Related U.S. Patent Documents

Reissue of:

[64] Patent No.: 4,257,902
Issued: Mar. 24, 1981
Appl. No.: 819,724
Filed: Jul. 27, 1977

U.S. Applications:

[63] Continuation of Ser. No. 477,981, Mar. 23, 1983, abandoned.

[30] Foreign Application Priority Data

| | | | |
|---|---|---|---|
| Aug. 4, 1976 | [ZA] | South Africa | 76/4685 |
| Sep. 28, 1976 | [ZA] | South Africa | 76/5792 |
| Sep. 28, 1976 | [ZA] | South Africa | 76/5793 |
| Sep. 28, 1976 | [ZA] | South Africa | 76/5794 |
| Nov. 26, 1976 | [ZA] | South Africa | 76/7076 |
| Nov. 26, 1976 | [ZA] | South Africa | 76/7077 |
| Feb. 21, 1977 | [ZA] | South Africa | 77/1013 |

[51] Int. Cl.[4] ..... C10M 173/00

[52] U.S. Cl. ..... 252/18; 252/25; 252/32.5; 252/32.7 E; 252/49.5; 252/52 A; 252/51.5 R; 252/75; 252/76; 252/391; 72/41; 72/42; 106/38.23

[58] Field of Search ..... 252/18, 25, 49.5, 51.5 A, 252/52 A, 51.5 R, 75, 76, 391; 72/41, 42

[56] References Cited

U.S. PATENT DOCUMENTS

| | | | |
|---|---|---|---|
| 2,287,639 | 6/1942 | Ping | 252/18 |
| 2,455,961 | 12/1948 | Walker | 252/78.1 |
| 2,682,523 | 6/1954 | Talley et al. | 252/49.5 |
| 2,944,976 | 7/1960 | Walers et al. | 252/76 |
| 2,956,951 | 10/1960 | Furey | 252/48.2 |
| 3,005,776 | 10/1961 | Langer et al. | 252/77 |
| 3,027,324 | 3/1962 | Rosenberg | 252/49.5 |
| 3,117,929 | 1/1964 | McCoy et al. | 252/33.2 |
| 3,227,652 | 1/1966 | Ackerman | 252/49.5 |
| 3,341,454 | 9/1967 | Chor et al. | 252/49.5 |
| 3,346,495 | 10/1977 | Malec et al. | 252/49.3 |
| 3,522,177 | 7/1970 | Benz | 252/49.5 |
| 3,526,595 | 9/1970 | Pellaton | 252/33.3 |
| 3,580,847 | 5/1971 | Boehmer | 252/78.5 |
| 3,654,153 | 4/1972 | Nikitin | 252/42.1 |
| 3,826,743 | 7/1974 | Kohls et al. | 252/25 |
| 3,833,502 | 9/1974 | Leary | 252/49.5 |
| 3,836,467 | 9/1974 | Jones | 252/25 |
| 3,843,529 | 10/1974 | Bertrand | 252/25 |
| 3,847,828 | 11/1974 | Latos | 252/49.5 |
| 3,860,521 | 1/1975 | Aepli et al. | 252/49.5 |
| 3,928,215 | 12/1975 | Dreher et al. | 252/49.5 |
| 3,931,020 | 1/1976 | Burgess et al. | 252/25 |
| 3,933,661 | 1/1976 | Abrams et al. | 252/49.5 |
| 3,953,344 | 4/1976 | Narushima | 252/49.5 |
| 3,980,569 | 9/1976 | Pindar et al. | 252/51.5 R |
| 3,983,042 | 9/1976 | Jain et al. | 252/18 |
| 4,001,125 | 1/1977 | Newton | 252/49.5 |
| 4,021,233 | 5/1977 | Habiby et al. | 208/179 |
| 4,032,461 | 6/1977 | Hoke | 252/46.7 |
| 4,036,772 | 7/1977 | Dorer | 252/56 R |
| 4,052,323 | 10/1977 | Feneberger et al. | 252/49.5 |
| 4,071,327 | 1/1978 | Dorer | 252/393 |
| 4,138,346 | 2/1979 | Nassry | 252/32.5 |
| 4,151,099 | 4/1979 | Nassry | 252/32.7 |
| 4,212,750 | 7/1980 | Gorman | 252/32.5 |

FOREIGN PATENT DOCUMENTS

| | | |
|---|---|---|
| 2017750 | 9/1980 | United Kingdom . |

OTHER PUBLICATIONS

"Cutting Oil Additives" by Mould et al., in Journal American Society of Lubrication Engineers, Jun., 1977, pp. 291–298.

*Primary Examiner*—Jacqueline V. Howard
*Attorney, Agent, or Firm*—Lowe, Price, LeBlanc, Becker & Shur

[57] ABSTRACT

Substantially oil-free aqueous industrial fluids comprise (A) up to as much as 99.9 percent by weight water, (B) at least one substantially water-insoluble functional additive stably dispersed in the water and (C) at least one substantially water-soluble liquid organic dispersing agent, said dispersing agent being capable of dispersing said functional additive in said fluid and are useful as liquids in a variety of industrial applications, such as hydraulic systems and metal shaping operations. Typically, these compositions also contain at least one water-soluble polymeric thickener and at least one corrosion inhibitor. Methods for preparing these fluids from concentrates are also disclosed.

35 Claims, No Drawings

WATER-BASED INDUSTRIAL FLUIDS

Matter enclosed in heavy brackets [ ] appears in the original patent but forms no part of this reissue specification; matter printed in italics indicates the additions made by reissue.

*This application is a continuation of application Ser. No. 477,981, filed Mar. 23, 1983 now abandoned, which is a reissue application of U.S. Pat. No. 4,257,902, filed Mar. 24, 1981.*

CLAIM FOR PRIORITY

This application claims the priorities of South African Patent Application 76/4685, filed Aug. 4, 1976; South African Patent Applications 76/5792, 76/5793 and 76/5794, each filed Sept. 28, 1976; South African Patent Applications 76/7076 and 76/7077, each filed Nov. 26, 1976; and South African Patent Application 77/1013, filed Feb. 21, 1977. Each of these applications is hereby incorporated by reference for its disclosures relating to water-based industrial fluids.

FIELD OF THE INVENTION

This invention relates to water-based industrial fluids; more particularly, it relates to industrial fluids containing at least one functional additive and at least one dispersing agent and substantially no oil. These fluids are normally liquid at temperatures at which water is liquid. Concentrates for preparing such fluids as well as methods for preparing the fluids and such concentrates and various uses of such fluids are also within the scope of the invention.

PRIOR ART

U.S. Pat. No. 3,117,929 discloses transparent water-containing lubricant compositions wherein the water is dispersed in oil in the form of micelles having an average diameter of less than about 0.1 micron. These lubricant compositions can contain E.P. agents such as tricresyl phosphate, chlorinated paraffin wax and sulfochlorinated olefin polymers.

U.S. Pat. No. 3,928,215 discloses cutting oil compositions containing water, surfacent, hydrocarbon oil and optionally cosurfactants and/or electrolytes. These cutting oil compositions are said to contain lamellar micelles.

U.S. Pat. No. 3,526,595 discloses water-based lubricating and cooling fluids containing (1) a water-soluble boundary lubricant, (2) a corrosion inhibitor, and (3) an anti-foam agent.

The journal "Lubrication Engineering", Volume 337, June, 1977, pages 291–298, contains an article by R. W. Mould, et al, which describes the use of water-soluble, organo chlorine compounds and organic and inorganic sulfur compounds in aqueous-based lubricating systems.

SUMMARY OF THE INVENTION

The substantially oil-free aqueous compositions of matter useful as the lubricants or functional liquids of this invention comprise (A) a major amount of water including up to as much as 99.9 percent by weight of water (based on the total weight of the composition), (B) a minor amount of at least one substantially water-insoluble functional additive stably dispersed therein, and (C) a minor amount of at least one substantially water-soluble, liquid organic dispersing agent, said dispersing agent being capable of stably dispersing said functional additive in said aqueous composition.

Optionally, but preferably, these compositions can also contain (D) at least one water-soluble polymeric thickener for said aqueous composition and (E) at least one inhibitor of corrosion of metal. As a further option, they can also contain (F) at least one shear stabilizing agent, especially when the thickener (D) is present. In addition, these compositions can also contain (G) at least one glycol of inverse solubility, (H) at least one bactericide, (J) at least one transparent dye, (K) at least one water softener, (L) at least one odor masking agent and (M) at least one anti-foamant, including one of these or mixtures of two or more.

Solid and liquid concentrates useful in preparing such substantially oil-free, aqueous compositions as well as methods for preparing such concentrates and aqueous compositions of matter are also within the scope of the invention as are various methods of using said compositions, for example, in the shaping of solid materials and hydraulic systems. The aqueous compositions of this invention can also be used to inhibit corrosion of ferrous metal and as mold release agents.

Other aspects of the invention will be apparent upon study of this specification and the appended claims.

DETAILED DESCRIPTION OF THE INVENTION

The aqueous compositions of matter of this invention are substantially oil-free. Such substantially oil-free compositions contain less than about three percent by weight oil (based on the total composition weight), usually they contain less than one percent oil, generally they contain less than about 0.5 percent oil, typically, less than 0.1 percent oil. The oils which are absent from the aqueous compositions of this invention are those oils which are known in the art to be useful as lubricating and functional fluid compositions such as cutting oils, grinding oils, and hydraulic fluids. Such oils are known to those of skill in the art to be mineral oils and certain synthetic oils, particularly water insoluble synthetic oils.

It is an essential feature of this invention that the inventive aqueous compositions are not emulsions. This clearly distinguishes them from the prior art water and oil emulsions which are used in certain industrial applications.

The aqueous compositions contain a major amount of water (including up to as much as 99.9 weight percent water). Typically, they contain about 90 to about 99 percent by weight water; usually, about 95 to about 99 percent by weight water.

Typically, these aqueous compositions have a viscosity range of about 10 to about 20,000 cps (when measured at 25 rpm at 20° C. with a number 3 spindle and a Brookfield viscometer). Generally, they have a viscosity of about 100 to about 4,000 cps (when measured by the same method.

In many embodiments, the aqueous compositions exhibit a pH value which falls in the range of about 7.5 to about 9.5. This is especially desirable when the compositions are intended for use in contact with ferrous metals.

THE FUNCTIONAL ADDITIVE (B)

The aqueous compositions of this invention contain a minor amount of at least one substantially water-insoluble functional additive stably dispersed therein. An additive is considered to be stably dispersed if the aqueous composition containing it remains as a homogeneous dispersion for at least 6 hours at 20° C. in the absence of significant agitation.

The water-insoluble functional additives used in these compositions typically have water-solubility at 25° C. of no more than 10 grams per liter; generally, a solubility no more than one gram per liter; and often less than one-tenth gram per liter.

Generally these functional additives are oil-soluble and in many instances function in conventional oil-based systems as E.P. (extreme pressure) agents, anti-wear agents, load-carrying agents, friction modifiers, and lubricity agents. They can also function as anti-slip agents, film formers, friction modifiers and lubricity agents in other compositions. As is well known, such additives can function in two or more of the above-mentioned ways; for example, E.P. agents often function as load-carrying agents also.

The functional additives of this invention also include certain solid lubricants such as graphite, molybdenum disulfide and polytetrafluoroethylene and related solid polymers.

The functional additive can also include frictional polymer formers. Briefly, these are potential polymer forming materials which are dispersed in a liquid carrier at low concentration and which polymerize at rubbing or contacting surfaces to form protective polymeric films on the surfaces. The polymerizations are believed to result from the heat generated by the rubbing and, possibly, from catalytic and/or chemical action of the freshly exposed surface. A specific example of such materials is dilinoleic acid and ethylene glycol combinations which can form a polyester frictional polymer film. These materials are known to the art and descriptions of them are found, for example, in the journal "Wear", Volume 26, pages 369-392, and West German Published Patent Application 2,339,065. These disclosures are hereby incorporated by reference for their discussions of frictional polymer formers.

Typically the functional additive is a known metal or amine salt of an organo sulfur, phosphorus, boron or carboxylic acid which is the same as or of the same type as used in oil-based fluids. Typical such salts are of (1) carboxylic acids of 1 to 22 carbon atoms including both aromatic and aliphatic acids; (2) sulfur acids such as alkyl and aromatic sulfonic acids and the like; phosphorus acids such as phosphoric acid, phosphorous acid, phosphinic acid, acid phosphate esters and analogous sulfur homologs such as the thiophosphoric and dithiophosphoric acid and related acid esters; boron acids include boric acid, acid borates and the like. Useful functional additives also include metal dithiocarbamates such as molybdenum and antimony dithiocarbamates; as well as dibutyl tin sulfide, tributyl tin oxide, phosphates and phosphites; borate amine salts, chlorinated waxes; trialkyl tin oxide, molybdenum phosphates, and chlorinated waxes.

Mainly such functional additives are known to the art. For example, descriptions of additives useful in conventional oil-based systems and in the aqueous compositions of this invention are found in "Advances in Petroleum Chemistry and Refining," Volume 8, Edited by John J. McKetta, Interscience Publishers, New York, 1963, pages 31-38 inclusive; Kirk-Othmer "Encyclopedia of Chemical Technology," Volume 12, Second Edition, Interscience Publishers, New York, 1967, page 575. "Lubricant Additives" by M. W. Ranney, Noyes Data Corporation, Park Ridge, N.J., U.S.A., 1973; and "Lubricant Additives" by C. V. Smalheer and R. K. Smith, The Lezius-Hiles Co., Cleveland, Ohio, U.S.A. These are hereby incorporated by reference for their disclosures of functional additives useful in the compositions of this invention.

In certain typical compositions, the functional additive is a sulfur or chloro sulfur extreme pressure agent, know to be useful in oil-base systems. Such materials include chlorinated aliphatic hydrocarbons, such as chlorinated wax; organic sulfides and polysulfides, such as benzyldisulfide, bis-(chlorobenzyl)disulfide, dibutyl tetrasulfide, sulfurized sperm oil, sulfurized methyl ester of oleic acid, sulfurized alkylphenol, sulfurized dipentene, sulfurized terpene, and sulfurized Diels-Alder adducts; phosphosulfurized hydrocarbons, such as the reaction product of phosphorus sulfide with turpentine or methyl oleate; phosphorus esters such as the dihydrocarbon and trihydrocarbon phosphites, i.e., dibutyl phosphite, diheptyl phosphite, dicyclohexyl phosphite, pentylphenyl phosphite, dipentylphenyl phosphite, tridecyl phosphite, distearyl phosphite and polypropylene substituted phenol phosphite; metal thiocarbamates, such as zinc dioctyldithiocarbamate and barium heptylphenol dithiocarbamate; and Group II metal salts of phosphorodithioic acid, such as zinc dicyclohexyl phosphorodithioate, and the zinc salts of a phosphorodithioic acid.

The functional additive can also be a film former such as a synthetic or natural latex or emulsion thereof in water. Such latexes include natural rubber latexes and polystyrene butadienes synthetic latexes, including those latexes which themselves comprise 66 percent emulsion in water. A specific useful example of the latter is the polystyrene butadiene latex obtainable from the Synthetic Rubber Company of The Republic of South Africa.

The functional additives (B) can also be anti-chatter or anti-squawk agents. Examples of the former are the amide metal dithiophosphate combinations such as disclosed in West German Pat. No. 1,109,302; amine salt-azomethine combinations such as disclosed in British Patent Specification No. 893,977; or amine dithiophosphate such as disclosed in U.S. Pat. No. 3,002,014. Examples of anti-squawk agents are N-acylsarcosines and derivatives thereof such as disclosed in U.S. Pat. Nos. 3,156,652 and 3,156,653; sulfurized fatty acids and esters thereof such as disclosed in U.S. Pat. No. 2,855,366; organo phosphorous acids/fatty acid combinations such as disclosed in U.S. Pat. Nos. 2,913,415 and 2,982,734; and esters of dimerized fatty acids such as disclosed in U.S. Pat. No. 3,039,967. The above-cited patents are incorporated hereby by reference for their disclosure as pertinent to anti-chatter and anti-squawk agents useful as a functional additive in the composition of the present invention.

Specific examples of functional additives useful in the oil-free, aqueous compositions of this invention include the following commercially available products.

TABLE I

| Functional Additive Tradename | Chemical Description | Supplier |
|---|---|---|
| Anglamol 32 | Chloro sulfurized hydrocarbon | Lubrizol[1] |
| Anglamol 75 | Zinc dialkyl phosphate | Lubrizol[1] |
| Molyvan L | A thiaphosphomolybdate | Vanderbilt[2] |

TABLE I-continued

| Functional Additive Tradename | Chemical Description | Supplier |
|---|---|---|
| Lubrizol-5315 | Sulfurized cyclic carboxylate ester | Lubrizol[1] |
| Emcol TS 230 | Acid phosphate ester | Witco[3] |

[1]The Lubrizol Corporation, Wickliffe, Ohio, U.S.A.
[2]R. T. Vanderbilt Company, Inc., New York, N.Y., U.S.A.
[3]Witco Chemical Corp., Organics Division, Houston, Texas, U.S.A.

Mixtures of two or more of any of the afore-described functional additives can also be used.

Typically, a functionally effective amount of the functional additive (B) is present in the aqueous compositions of this invention. For example, if the additive (B) is intended to serve primarily as a load carrying agent, it is present in a load carrying amount.

THE WATER-SOLUBLE DISPERSING AGENT (C)

The compositions of the present invention contain at least one water-soluble dispersing agent (C). Such dispersing agents have a solubility in water of a minimum of about 5 grams per liter in water at 20° C. Generally, they have solubility in water of a minimum of about 10 grams per liter; usually a solubility of about 20 grams per liter at 20° C. These dispersing agents are capable of dispersing said functional additive in said aqueous composition. The dispersing agent is capable of stably dispersing (as defined hereinabove) a minimum of at least about 5 grams of said functional additive per liter of water; typically it can disperse at least about 50 grams of the functional additive in a liter of water. Usually the dispersing agent can dissolve at least about 10 grams of functional additive, generally at least about 50 grams per liter of dispersing agent. Said dispersions include dispersions wherein functional additive is stably dispersed, but not dissolved as well as true solutions and psuedo-solutions including micelle-containing compositions.

Generally, the dispersing agent is selected from the group consisting of hydroxy-substituted hydrocarbon amines (particularly mono-, di-, and tri-alkanol amines wherein each alkanol group contains 2 to about 10 carbon atoms); hydrocarbyl amines (including mono-, di-, and tri-hydro-carbon amines wherein each hydrocarbon group has 1 to about 20 carbon atoms); polyols of 3 to 8 hydroxyls (including those having 3 to 8 hydroxyl groups and 3 to 12 aliphatic carbon atoms and analogous materials made by treating such polyols with alkylene oxides of 2 to 8 carbon atoms); alkylene glycols (including those wherein the alkylene group has 2 to 4 carbon atoms); polyalkylene glycols (including those wherein each alkylene group is of 2 to 4 carbon atoms and the polyalkylene glycol has molecular weights ranging from 50 to about 1500) and sulfonated materials such as sulfonated hydrocarbon and amine-neutralized salts thereof. Among the sulfonated materials are included the sulfonamidocarboxylic acids and neutralized derivatives thereof (particularly wherein the amine is triethanol amine) such as disclosed in U.S. Pat. No. 3,666,779, which is hereby incorporated by reference for its disclosures relavent thereto.

Specific useful dispersing agents include di- and triethanol and propanol amine, polypropylene glycols, particularly those having an average molecular weight of about 700 to about 1200 and solubility of at least about 20 grams per liter in water at 20° C., glycerine, liquid sugar alcohols, alkali and alkaline earth metal, dodecylbenzene sulfonates, alkali metal laurylsulfonates, and the like. Many other such dispersing agents are known to those of skill in the art. See, for example, the list beginning at page 52 entitled "Coupling Agents" in "McCutcheon's Publications—Combined Edition, Book III—Functional Materials", published by the McCutcheon's Division, M. C. Publishing Co., Ridgewood, N.J., U.S.A., 1976, which is hereby expressly incorporated by reference for its disclosures of useful dispersing agents.

Specific commercially available dispersing agents (in addition to those mentioned above) include those set forth in the following table:

TABLE II

| Dispersing Agent Tradename | Chemical Description | Supplier |
|---|---|---|
| Pluriol P 900 | Polypropylene glycol; Av. Mol. Wt. ~900 | BASF-Wyandotte[1] |
| Hostacor KS-1 | Sulfonamide carboxylic acid neutralized with tri ethanol amine[2] | Hoechst[3] |

[1]BASF - Wyandotte Corporation, Wyandotte, Michigan.
[2]As described in U.S. Pat. No. 3,666,779
[3]Farbwerke Hoechst AG, Frankfurt, West Germany.

Mixtures of two or more of any of the afore-described dispersing agents can also be used.

Generally, a dispersing amount of the dispersing agent (C) is present in the aqueous compositions of this invention.

THE WATER-SOLUBLE THICKENER (D)

Often the aqueous compositions of this invention contain (D) at least one water-soluble polymeric thickener for thickening the aqueous composition. Generally, these thickening agents can be polysaccharides, synthetic thickening polymers, or mixtures of two or more of these. Among the polysaccharides that are useful are natural gums such as those disclosed in "Industrial Gums" by Whistler and B. Miller, published by Academic Press, 1959. Disclosures in this book relating to water-soluble thickening natural gums in hereby incorporated by reference. Specific examples of such gums are gum agar, guar gum, gum arabic, algin, dextrans, xanthan gum and the like.

Also among the polysaccharides that are useful as thickeners for the aqueous compositions of this invention are cellulose ethers and esters, particularly the hydroxy hydrocarbyl cellulose and hydrocarbylhydroxy cellulose and its salts. Specific examples of such thickeners are hydroxyethyl cellulose and the sodium salt of carboxymethyl cellulose. Mixtures of two or more of any such thickeners are also useful and a 1:1 by weight mixture of hydroxyethyl cellulose and carboxymethyl cellulose sodium salt has been found to be particularly useful.

It is a general requirement that the thickener (D) used in the aqueous compositions of the present invention be soluble in both cold (10° C.) and hot (about 90° C.) water. This excludes such materials as methyl cellulose which is soluble in cold water but not in hot water. Such hot-water-insoluble materials, however, can be used to perform other functions such as providing lubricity to the aqueous compositions of this invention as described hereinbelow.

The thickeners (D) used in the aqueous compositions of this invention can also be synthetic thickening polymers. Many such polymers are known to those of skill in the art. Representative of them are polyacrylates, polyacrylamides, hydrolyzed vinyl esters, water-soluble homo- and inter-polymers of acrylamidoalkane sulfonates containing 50 mole percent at least of acryloamido alkane sulfonate and other comonomers such as acrylonitrile, styrene and the like. Poly-n-vinyl pyrrolidones homo- and copolymers as well as water-soluble salts of styrene, maleic anhydride and isobutylene maleic anhydride copolymers can also be used as thickening agents.

Other useful thickeners are known to those of skill in the art and many can be found in the list in the aforementioned McCutcheon Publication: "Functional Materials," 1976, pages 135–147, inclusive. The disclosures therein, relative to water-soluble polymeric thickening agents meeting the general requirements set forth above are hereby incorporated by reference.

Typical commercially available thickeners (D) include those set forth in the following table:

TABLE III

| Thickener; Tradename | Chemical Description | Supplier |
|---|---|---|
| Natrosol 250 LR | Hydroxyethyl cellulose[1] | Hercules[2] |
| Natrosol HHR | Hydroxyethyl cellulose[3] | Hercules[2] |
| Cellosize QP | Hydroxyethyl cellulose[4] | Union Carbide[5] |
| Cellosize QP 100 M | Hydroxyethyl cellulose[6] | Union Carbon[5] |
| Hercules 7MC | Sodium carboxy methyl cellulose | Hercules[2] |

[1]A 1% wt/vol. solution in water at 23° C. has a viscosity of about 1000 cps.
[2]Hercules Incorporated, Wilmington, Delaware, U.S.A.
[3]A 1% wt/vol. solution in water at 25° C. has a viscosity of about 3400–5000 cps.
[4]A 2% wt/vol. solution in water at 25° C. has a viscosity of about 1000 cps.
[5]Union Carbide Corporation, New York, N.Y., U.S.A.
[6]A 1% wt/vol. solution in water at 25° C. has a viscosity of about 4000–5200 cps.

(Viscosities are measured by the techniques set forth at pages 22–24 of the brochure "Natrosol", 1974, available from Hercules Inc., and those set forth at pages 19–24 of the brochure "Cellosize", 1974, available from the Union Carbide Corp.).

Typically, the thickener (D) is present in a thickening amount in the aqueous compositions of this invention.

THE INHIBITOR OF CORROSION (E)

The aqueous compositions of this invention often contain at least one inhibitor for corrosion of metals (E). These inhibitors can prevent corrosion of either ferrous or non-ferrous metals (e.g., copper, bronze, brass, titanium, aluminum and the like) or both. The inhibitor can be organic or inorganic in nature. Usually it is sufficiently soluble in water to provide a satisfactory inhibiting action though it can function as a corrosion inhibitor without dissolving in water, it need not be water-soluble. Many suitable inorganic inhibitors useful in the aqueous compositions of the present invention are known to those in the art. Included are those described in "Protective Coatings for Metals" by Burns and Bradley, Reinhold Publishing Corporation, Second Edition, Chapter 13, pages 596–605. These disclosures relative to inhibitors are hereby incorporated by reference. Specific examples of useful inorganic inhibitors include alkali metal nitrites, sodium di- and tri-polyphosphate, potassium and dipotassium phosphate, alkali metal borate and mixtures of the same. Many suitable organic inhibitors (E) are known to those of skill in the art. Specific examples include hydrocarbyl amine and hydroxy-substituted hydrocarbyl amine neutralized acid compound, such as neturalized phosphates and hydrocarbyl phosphate esters, neutralized fatty acids (e.g., those having 8 to about 22 carbon atoms), neutralized aromatic carboxylic acids (e.g., 4-tertiarybutyl benzoic acid), neutralized naphthenic acids, neutralized hydrocarbyl sulfonates. Mixed salt esters of alkylated succinimides are also useful. Particularly useful amines include the alkanol amines such as ethanol amine, diethanol amine, triethanol amine and the corresponding propanol amines. Mixtures of two or more of any of the afore-described corrosion inhibitors can also be used.

Many useful inhibitors of corrosion (E) are known to those of skill in the art and include those set forth in the afore-described McCutcheon publication "Functional Materials", under the heading "Corrosion Inhibitors" on pages 48–52, which is hereby incorporated by reference for its disclosure of useful inhibitors of corrosion, for use in the aqueous compositions of the present invention.

The corrosion inhibitor (E) is usually present in concentrations in which they are effective in inhibiting corrosion of metals with which the aqueous composition comes in contact.

THE SHEAR STABILIZING AGENT (F)

The aqueous compositions of the present invention can also include at least one shear stabilizing agent (F). Such shear stabilizing agents are especially useful where the aqueous composition is intended to function as a hydraulic fluid. The shear stabilizing agent (F) interacts with one or more of the thickeners present in a manner so as to make the viscosity of the aqueous solution substantially independent of the shear applied to the fluid. Such interactions are known to the art. For example, aqueous compositions thickened with cellulose esters or ethers can be shear stabilized by adding polyoxyalkylene polyols, particularly those where the alkylene group is an ethylene group, propylene group, or mixture of such groups. Other materials such as tetrasodium pyrophosphate are also known to be shear stabilizing agents and thus useful. A specific shear stabilizing agent is available under the tradename Pluracol V-10 from BASF-Wyandotte Corporation, Wyandotte, Mich., U.S.A., Pluradol V-10 is a polyoxypropylene polyol having a viscosity at 38° C. of about 45,000 cSt.

Typically, the shear stabilizing agent (F), when present, is present in a shear stabilizing amount.

THE OTHER OPTIONAL ADDITIVES

Certain of the aqueous compositions of the present invention (particularly those that are used in cutting or shaping of metal) can also contain (G) at least one polyol with inverse solubility in water. Such polyols are those that become less soluble as the temperature of the water increases. They thus can function as surface lubricity agents during cutting or working operations since, as the liquid is heated as a result of friction between a metal workpiece and worktool, the polyol of inverse solubility "plates out" on the surface of the workpiece, thus improving its lubricity characteristics.

The aqueous compositions of the present invention can also include at least one bacteriocide (H). Such bacteriocides are well known to those of skill in the art and specific examples can be found in the afore-mentioned McCutcheon publication "Functional Materials" under the heading "Antimicrobials" on pages 6–16 thereof. This disclosure is hereby incorporated by reference as it relates to suitable bacteriocides for use in the aqueous compositions of this invention. Generally, these bacteriocides are water soluble, at least to the extend to allow them to function as bacteriocides.

The aqueous compositions of the present invention can also include such other materials as (J) dyes, e.g., an acid green dye; (K) water softeners, e.g., ethylene diamine tetraacetate sodium salt or nitrilo triacetic acid; (L) odor masking agents, e.g., citronella, oil of lemon, and the like; and (M) anti-foamants, such as the well known silicone anti-foamant agents.

The aqueous compositions of this invention may also include an anti-freeze additive where it is desired to use the composition at a low temperature. Materials such as ethylene glycol and analogous polyoxyalkylene polyols can be used as anti-freeze agents. Clearly, the amount used will depend on the degree of anti-freeze protection desired and will be known to those of ordinary skill in the art.

While the practice of the present invention is not dependent on any particular theory or hypothesis to explain the invention, it is believed that in most instances, the aqueous compositions of the present invention comprise at least in part a micelle dispersion of the functional additives in water. Visually, these aqueous compositions appear to be true solutions in that they are clear, both as concentrates and upon dilution. As mentioned above, they are not oil-in-water or water-in-oil emulsions such as those known to the prior art. This conclusion is based on the observation that dilution of the aqueous compositions themselves or concentrates used to make them produce insignificant or no cloudiness, such as would be formed from an emulsion or microemulsion. Such emulsions or microemulsions invariably break and become cloudy when they are diluted sufficiently.

Microscopic studies have not revealed the presence of any emulsified phase in the aqueous compositions of the present invention. If, in fact, the aqueous compositions of this invention are micellular dispersions, it is quite possible that, when present, the thickeners (D) form protective colloids for the micelles of functional additive (B) and surround it and thus stabilize the dispersion. Similarly, certain of the afore-described inhibitors (E) with surface active properties may help to stabilize the micellular dispersions.

It should also be noted that many of the ingredients described above for use in making the aqueous compositions of this invention are industrial products which exhibit or confer more than one property on the composition. Thus, a single ingredient can provide several functions thereby eliminating or reducing the need for some other additional ingredient. Thus, for example, a dispersing agent may also serve in part as an inhibitor of corrosion. Similarly, it may also serve as a neutralizing agent to adjust pH or as a buffer to maintain pH. Similarly, an E.P. agent such as tributyl tin oxide can also function as a bactericide.

Usually, the aqueous compositions of the present invention are made by first forming a liquid or solid concentrate and then diluting same at the point of use to form the fully diluted aqueous composition. If it is desired to omit the concentrate step, the methods described below can be used, except the amount of water is increased to the desired level for the finished aqueous composition.

Generally, the concentrates for making the substantially oil-free aqueous compositions of this invention comprise (A) water, (B) at least one substantially water-insoluble functional additive, stably dispersed therein, and (C) at least one substantially water-soluble liquid organic dispersing agent, said dispersing agent being capable of dispersing the functional additive. The concentrations of the ingredients of these concentrates is such that when diluted, usually with water, the resulting final aqueous composition contains effective amounts of the ingredients.

Solid concentrates for making the substantially oil-free aqueous compositions of this invention are made by the method comprising combining the functional additive (B) described hereinabove and the dispersing agent (C) described hereinabove with any of the desired solid components, such as described above, wherein said solid components are in a powder form, said combination taking place in such a manner that the additive (B) and the dispersing agent (C) are absorbed on the surface of the solid component.

Generally, the method for making such solid concentrates is carried out in a manner wherein the functional additive (B) and the dispersing agent (C) are premixed to form a liquid dispersion and the solid components are at least one thickener (D) and at least one inhibitor (E) of corrosion of metal.

The amount of ingredients used in making the solid concentrates generally falls within the broad ranges set forth hereinbelow.

The solid concentrate can be converted into the desired aqueous composition of this invention by diluting it with water. Typically, the weight ratio of solid concentrate to water is in the range of about 1:20 to about 1:300.

When the concentrate is liquid it is often desirable to prepare it by the method comprising mixing (A) water, (B) at least one substantially water-insoluble functional additive, and (C) at least one substantially water-soluble liquid organic dispersing agent capable of dispersing said additive, said mixing carried out in a manner so as to avoid emulsion formation. Typically, the liquid concentrates are made by the method comprising first mixing the additive (B) with the dispersing agent (C) and then adding the resulting mixture to (A) water, while it is being agitated at less than about 40° C., generally less than about 10° C., often about 5° C. Usually the ratio by weight of (B) to (C) falls in the range of about 1:20 to about 20:1 and the temperature is below about 10° C. When it is desired to have a thickener present in the concentrate it is prepared by the method comprising first adding a portion of the thickener (D) to be used to a portion of the water (A) to be used so as to form a thickened mixture in which the thickening agent is substantially solvated, cooling the thickened mixture to less than about 40° C. (generally less than about 10° C.; typically less than about 5° C.) and then adding an admixture of functional additive (B) with the dispersing agent (C) and agitating so as to disperse the admixture and the thickened mixture and finally adding the balance of the thickener (D) and water (A) to be used. Usually, about 25–75 weight percent of the total amount of water (A) and about 25–75 weight percent of the thickening agent (D) is used in the first step; often an inhibitor (E) for corrosion of metal is added before the last step.

Another method for making a liquid concentrate for making the substantially oil-free, emulsion-free aqueous compositions of the present invention comprises first mixing the additive (B) with the dispersing agent (C)

then adding the resulting mixture to water (A) while it is being agitated at less than about 40° C. (typically less than about 10° C., usually less than about 5° C.) and then adding the total amount of thickener (D) to be used, storing the resulting mixture until the thickener is solvated and then agitating the mixture until the solvated thickener is satisfactorily dispersed.

Generally, the concentrates (whether solid or liquid) used for preparing the substantially oil-free aqueous compositions of the present invention comprise about 0.01–5 percent by weight of at least one functional additive (B) and about 0.001–50 percent by weight of at least one dispersing agent (C). When a water soluble polymeric thickener is present in the concentrate it comprises about 0.1–40 percent by weight of the concentrate. When there is also present at least one inhibitor of corrosion of metal (E), it comprises about 0.3–50 weight percent of the concentrate. When at least one shear stabilizing agent is present in the concentrate (F), it comprises about 5–200 percent by weight of the thickener present in the concentrate. When the concentrate is liquid the balance is usually water and/or the optional ingredients set forth hereinabove.

The aqueous compositions of the present invention are made from the afore-described concentrates by mixing them with water. When the concentrate is a liquid one, it is mixed with about 1 to about 50 parts by weight of water; typically, about 2–10 parts by weight water.

As indicated hereinabove, to obtain the final aqueous compositions of this invention, these concentrates must be diluted so that they contain at least about 90 percent by weight water. Lesser dilutions of a given concentrate can, of course, produce concentrates which are within the scope of the invention and can themselves be further diluted to give the final aqueous composition.

Clearly, the concentrations of the various ingredients in the concentrate (as set forth above) and the dilution factors (as set forth above) determine the concentrations of the various ingredients in the final aqueous compositions of this invention. For example, if the concentrate contains 1% (B), and 5% (C), and it is diluted 1:9 with water, it will produce a final aqueous composition containing about 0.1% (B) and 0.5% (C).

As is known to those of skill in the art, said mixing can be accompanied by the necessary agitation to form a homogeneous disperse system.

The aqueous compositions of the present invention can be used in methods for shaping solid material with a work tool by lubricating the tool and/or the material. These shaping processes comprise cutting, grinding, drilling, punching, stamping, turning, lapping, polishing, rolling, drawing, and combinations of said processes. Often the solid material is a metal work piece or it may be earth, rock, sand, concrete, or a mixture of these. When the work piece is metal, it can comprise at least one ferrous or at least one non-ferrous metal or a combination of both. When the material is earth, rock, sand, concrete, cement, or mixture of these, the tool is often a drill, hammer, saw or grinding instrument. Often the tool is a drill of rotary or precussion-type and the earth, rock, sand, concrete, cement, or mixture of same, overlies a naturally occuring deposit, such as a deposit of fossil fuel, an ore body, or an economically valuable mineral such as gem stones and the like.

The aqueous compositions of the present invention can also be used in mold releasing processes where they function as mold release agents. They can also be used to retard the corrosion of ferrous metal bodies by covering at least a portion of the surface of such bodies with the aqueous composition. When they are used in the latter method, the functional additive (B) is often a film former and usually (E) at least in one inhibitor of corrosion of metals as described hereinbefore is present. Useful film formers are well known and include such materials as the latices described hereinabove.

The aqueous compositions of the present invention can also be used in hydraulic systems. Among the hydraulic systems which can include the aqueous compositions of the present invention are pit props or powered supporting devices which are used in underground mining operations to prevent cave-ins and the like.

Specific embodiments of the present invention are included in the following examples, which also include the presently known best mode of practicing the invention.

EXAMPLE 1

A liquid concentrate useful in preparing an aqueous composition of matter according to this invention is made as follows. To make one liter of concentrate, the following ingredients are assembled in the indicated amounts:

| | | |
|---|---|---|
| (a) | A first portion of Hydroxy ethyl cellulose (Natrosol 250 GR)[1] | 10 g. |
| (b) | A first portion of Sodium carboxy methyl cellulose (Hercules 7M8S)[1] | 10 g. |
| (c) | Molyvan L | 1 g. |
| (d) | A first portion of Polypropylene glycol (Pluriol P900) | 1 g. |
| (e) | Anglamol 32 | 1 g. |
| (f) | Lubrizol 5315 | 1 g. |
| (g) | Tributyl tin oxide | 1 g. |
| (h) | A second portion of Polypropylene glycol (Pluriol P900) | 2 g. |
| (i) | A first portion of Diethanolamine | 5 g. |
| (j) | Emulan SH[2] | 10 g. |
| (k) | A second portion of Diethanolamine | 5 g. |
| (l) | Emcol TS 230[3] | 10 g. |
| (m) | Para tertiary butyl benzoic acid previously neutralized with triethanolamine as 50% solution in water. | 10 g. |
| (n) | A second portion of Hydroxy ethyl cellulose (Natrosol 250 GR) | 10 g. |
| (o) | A second portion of Sodium carboxy methyl cellulose (Hercules 7M8S) | 8 g. |
| (p) | Green metal acid dye | 1 g. |

[1]Available from Hercules Incorporated

[2]A nitrogenous fatty acid condensation product in the form of the free carboxylic acid. anionic. Functions as a corrosion inhibitor. Available from BASF corporation of West Germany.

[3]A corrosion inhibitor available fron the WITCO Chemical Corporation, New York, N.Y., U.S.A.

The above ingredients are combined as follows: (a) and (b) are mixed as dry powders and then dispersed into 600 ml of water and allowed to hydrate. The thickened water mixture is cooled to about 5° C. with ice and a portion thereof is mixed with ingredients (c) and (d) and the mixture again well dispersed. Ingredients (e), (f), (g) and (h) are mixed and dispersed well into the balance of the thickened water. The two portions of thickened water containing the various other ingredients are then recombined and mixed. Ingredients (i), (j), (k), (l) and (m) are individually added to the thickened mixture which is thoroughly agitated after each addition to form a homogeneous mixture. Ingredients (n), (o) and (p) are then individually dispersed into the thickened mixture. The volume of mixture is then brought up to one liter total volume and stored for about 24 hours with occasional agitation.

EXAMPLE 2

One liter of concentrated aqueous liquid useful as a machining fluid is made by replacing ingredients (a) and (b) and (n) and (o) of Example 1 with hydroxy ethyl cellulose (Natrosol HHR) in the amount of 6 grams.

EXAMPLE 3

Aqueous compositions useful as machining fluids are made by diluting the concentrate made according to Example 1 to 4, 6, 8, or 10 liters depending on the severity of the machining operation in which they are to be used.

EXAMPLE 4

One liter of an aqueous composition according to this invention useful as a hydraulic fluid is made by assembling the following ingredients in the indicated amount.

| | | |
|---|---|---|
| (a) | Hydroxy ethyl cellulose (Natrosol LR)[1] | 40 g. |
| (b) | Molyvan L | 1 g. |
| (c) | A first portion of polypropylene glycol (Pluriol P900) | 1 g. |
| (d) | Anglamol 32 | 1 g. |
| (e) | Lubrizol 5315 | 1 g. |
| (f) | Tributyl tin oxide | 1 g. |
| (g) | A second portion of polypropylene glycol (Pluriol P900) | 2 g. |
| (h) | Diethanolamine | 5 g. |
| (i) | Emulan SH | 10 g. |
| (j) | Para tertiary butyl benzoic acid previously neutralized with triethanolamine as a 50% solution | 10 g. |
| (k) | Pluracol V10 | 20 g. |
| (l) | Ethylene glycol | 50 g. |
| (m) | Dye | 1 g. |

Available from Hercules Incorporated

Ingredient (a) is dispersed in 600 ml. of water and allowed to hydrate. The thickened mixture is then cooled to about 5° with ice. Ingredients (b) and (c) are mixed and then dispersed well into a portion of the thickened water. Ingredients (d), (e), (f), and (g) are dispersed well into the remainder of the thickened water. The two portions of thickened water are recombined and agitated to form a homogeous dispersion. The remaining ingredients are added individually to the thickened mixture which is agitated after each addition. The mixture is then brought up to a total volume of 1 liter with water.

EXAMPLE 5

A liquid concentrate useful in pit props is made as follows. The following ingredients are assembled in the indicated amounts.

| | | |
|---|---|---|
| (a) | Hydroxy ethyl cellulose (Natrosol LR) | 40 g. |
| (b) | Molyvan L | 2 g. |
| (c) | A first portion of polypropylene glycol (Pluriol P900) | 2 g. |
| (d) | Anglamol 32 | 2 g. |
| (e) | Lubrizol 5315 | 2 g. |
| (f) | Tributyl tin oxide | 2 g. |
| (g) | A second portion of polypropylene glycol (Pluriol P900) | 12 g. |
| (h) | Diethanolamine | 50 g. |
| (i) | Emulan SH | 100 g. |
| (j) | Para tertiary butyl benzoic acid previously neturalized with triethanolamine as a 50% solution in water | 100 g. |
| (k) | Dye (red) | 1 g |

These ingredients are combined as follows: Ingredient (a) is dispersed to 500 ml. of water and allowed to solvate. The thickened mixture is cooled with ice to a temperature of about 5° C. Ingredients (b) and (c) are dispersed in a portion of the thickened water. Ingredients (d), (e), (f) and (g) are individually dispersed into the remainder of the thickened water. The two portions of water are recombined and mixed well. Ingredients (h), (i), (j) and (k) are individually, thoroughly dispersed in the thickened water solution which is then made up to a total volume of 1 liter. This concentrate is diluted with about 20 parts of water to make the final pit prop fluid. Ethylene glycol can be added if desired, in an amount to give the desired anti-freeze properties.

EXAMPLE 6

A solid concentrate useful in making an aqueous composition useful as a light duty machining fluid is made as follows. The following ingredients are assembled in the indicated amounts to make a kilogram of concentrate.

| | | |
|---|---|---|
| (a) | Hydroxy ethyl cellulose (Natrosol HHR)[1] | 110 g. |
| (b) | Sodium tripolyphosphate | 20 g. |
| (c) | Dipotassium phosphate | 150 g. |
| (d) | Borax | 50 g. |
| (e) | Sodium nitrite | 400 g. |
| (f) | Triethanolamine | 100 g. |
| (g) | Triethanolamine phosphate | 40 g. |
| (h) | Hostacor KS1 | 30 g. |
| (i) | Anglamol 32 | 2 g. |
| (j) | Lubrizol 5315 | 2 g. |
| (k) | Molyvan L | 1 g. |
| (l) | Tributyl tin oxide | 2 g. |
| (m) | Dye | 3 g. |

[1]Available from Hercules Incorporated

The above ingredients are combined in the following fashion. The dry ingredients (a), (b), (c), (d), (e) and (m) are mixed as dry powders. The liquid ingredients (f), (g), (h), (j), (k) and (i) are mixed together. The liquid mixture is then carefully added to the powdered solids with sufficient agitation to evenly distribute it. The mixture is then stored for approximately 16 hours. Any lumps which form are broken by screening through a 10 mesh screen. The resulting powder is then well mixed and stored until use.

The powder can be dissolved or dispersed in water in a concentration of 0.5 to 2.5 percent weight powder per volume of water to provide machining fluids for use in operations of varying severity.

EXAMPLE 7

A concentrate useful in making an aqueous composition for use as a heavy-duty machining fluid is made as follows. The following ingredients are assembled in the indicated amounts.

| | | |
|---|---|---|
| (a) | Hydroxy ethyl cellulose (Natrosol HHR) | 6 g. |
| (b) | Sodium nitrite | 30 g. |
| (c) | Sodium tripolyphosphate | 30 g. |
| (d) | Dye | 1 g. |
| (e) | Anglamol 32 | 3 g. |
| (f) | Lubrizol 5315 | 3 g. |
| (g) | Molyvan L | 3 g. |
| (h) | Tributyl tin oxide | 2 g. |

-continued

| | | |
|---|---|---|
| (i) | A first portion of Hostacor KS1 | 10 g. |
| (j) | A second portion of Hostacor KS1 | 140 g. |

The dry solids (a), (b), (c) and (d) are thoroughly mixed. The liquid ingredients (e), (f), (g), (h) and (i) are mixed; then the liquid mixture is slowly added to the solid mixture with good agitation so as to evenly distribute it. The resulting mixture is stored for approximately 16 hours and then any lumps are broken by screening through a 10 mesh screen. The resulting powder is mixed with 800 ml. of water and ingredient (j) is added. The resulting mixture is thoroughly dispersed. Water is added to bring the total mixture up to a volume of one liter. This concentrate can be diluted with 3 to 5 parts of water to provide a machining fluid.

EXAMPLE 8

The following ingredients are assembled in the indicated amounts.

| | | |
|---|---|---|
| (a) | Ethyl hydroxy cellulose | 100 g. |
| (b) | Sodium Nitrite | 300 g. |
| (c) | Sodium tripolyphosphate | 20 g. |
| (d) | Dipotassium phosphate | 150 g. |
| (e) | Borax | 50 g. |
| (f) | Triethanolamine | 190 g. |
| (g) | Triethanolamine phosphate | 40 g. |
| (h) | Hostacor KS1 | 30 g. |
| (i) | Anglamol 32 | 2 g. |
| (j) | Anglamol 75 | 2 g. |
| (k) | Molyvan L | 1 g. |
| (l) | Tributyl tin oxide | 2 g. |
| (m) | Dye (green acid dye) | about 1 g. (to suit) |
| (n) | Perfume (citronella perfume) | about 1 g. (to suit) |

The liquid ingredients are thoroughly mixed with approximately 60% of the triethanol amine. The solid ingredients are then blended into this liquid mixture. The liquid is absorbed into the solid ingredients to leave a powder which is then stored. When the aqueous composition is desired, the dry powder is diluted to a concentration of approximately 2.5% (weight to volume) with water and thoroughly mixed for 3 minutes in a blender. During this mixing operation, the remaining triethanol amine is added. The solution is then diluted to a concentration of 0.5% active ingredient per volume of water to provide an aqueous composition which can be used as the lubricant for machining operations, boring, reaming, thread cutting, grinding on conventional metals such as ferrous metals.

EXAMPLE 9

The following ingredients are assembled in the indicated amounts.

| | | |
|---|---|---|
| (a) | Triethanolamine phosphate | 30 g. |
| (b) | Ethyl hydroxy cellulose | 12 g. |
| (c) | Sodium Nitrate | 60 g. |
| (d) | Sodium Tripolyphosphate | 60 g. |
| (e) | Hostacor KS1 | 300 g. |
| (f) | Anglamol 32 | 6 g. |
| (g) | Anglamol 75 | 6 g. |
| (h) | Molyvan L | 6 g. |
| (i) | Tributyl Tin oxide | 3 g. |
| (j) | Dye | To suit |
| (k) | Perfume | To suit |

All the liquids apart from ingredient (e) are thoroughly mixed. The solid ingredients are similarly thoroughly mixed to form a powder. This powder is then dissolved in water and ingredient (e) is added to form an approximately 20% active ingredient (weight per volume) dispersion or solution. The total volume of this dispersion is approximately 2 liters. This concentrated dispersion can be further diluted with water to make an aqueous composition having 5% by weight per volume of active ingredients, which is useful for such operations as tapping and thread cutting.

What is claimed is:

1. A substantially oil-free aqueous *emulsion-free* composition of matter useful as a lubricant or functional liquid comprising (A) a major amount of water including up to as much as 99.9 percent by weight of water, (B) a minor *but effective* amount of at least one substantially water-insoluble, oil-soluble functional additive stably dispersed therein, wherein the functional additive (B) is a sulfur- or chlorosulfur-containing E.P. agent or mixture of two or more of these, (C) a minor *but effective* amount of at least one substantially water-soluble, liquid organic dispersing agent, said dispersing agent being capable of *dissolving said functional additive and* stably dispersing said functional additive in said aqueous composition [and wherein (D) at least one water-soluble polymeric thickener for said aqueous composition is present] *and (D) at least one water soluble polymeric thickener for said aqueous composition, said composition of matter being formed by premixing (B) and (C) and then mixing with the other components.*

2. A substantially oil-free aqueous *emulsion-free* composition of matter useful as a lubricant or functional liquid comprising (A) a major amount of water including up to as much as 99.9 percent by weight of water, (B) a minor *but effective* amount of at least one substantially water-insoluble, oil-soluble functional additive stably dispersed therein, wherein the functional additive is a sulfur- or chlorosulfur-containing E.P. agent or mixture of two or more of these, (C) a minor *but effective* amount of at least one substantially water-soluble, liquid organic dispersing agent, said dispersing agent being capable of *dissolving said functional additive and* stably dispersing said functional additive in said aqueous composition and [wherein (D) at least one water-soluble polymeric thickener for said aqueous composition is present] *(D) at least one water soluble polymeric thickener for said aqueous composition,* wherein the dispersing agent (C) is selected from the group consisting of hydroxyl-substituted hydrocarbon amines, hydrocarbon amines, polyols of 3 to 8 hydroxyls, alkylene glycols, polyoxyalkylene glycols, sulfonated hydrocarbons, and mixtures of two or more of these *said composition of matter being formed by premixing (B) and (C) and then mixing with the other components.*

3. A composition as claimed in claim 1 comprising about 90–99 percent by weight water.

4. A composition as claimed in claim 2 comprising about 90–99 percent by weight water.

5. A composition as claimed in claim 2 having a viscosity in the range of about 10 to about 20,000 cps when measured at 25 rpm and 20° C. with No. 3 spindle in a Brookfield viscometer.

6. A composition as claimed in claim 3 having a viscosity in the range of about 10 to about 20,000 cps when measured at 25 rpm and 20° C. with No. 3 spindle in a Brookfield viscometer.

7. A composition as claimed in claim 1 wherein the thickener (D) comprises a polysaccharide, a synthetic thickening polymer, or a mixture of two or more of these.

8. A composition as claimed in claim 2 wherein the thickener (D) comprises a polysaccharide, a synthetic thickening polymer, or a mixture of two or more of these.

9. A composition as claimed in claim 2 wherein the thickener (D) is selected from the group consisting of hydroxyethyl cellulose, alkali metal salts of carboxymethyl cellulose and mixtures of same.

10. A composition as claimed in claim 6 *comprising about 90–99 percent by weight water, having a viscosity in the range of about 10 to about 20,000 cps when measured at 25 rpm and 20° C. with No. 3 spindle in a Brookfield viscometer, and* wherein the thickener (D) is selected from the group consisting of hydroxyethyl cellulose, alkali metal salts of carboxymethyl cellulose, poly-n-vinyl pyrrolidones and mixtures of two or more of any of these.

11. A composition as claimed in claim 2 wherein there is also present (E) *an effective amount* at least one inhibitor of corrosion of metal.

12. A composition as claimed in claim 6 wherein there is also present (E) *an effective amount* at least one inhibitor of corrosion of metal.

13. A composition as claimed in claim 11 wherein the inhibitor (E) inhibits corrosion of ferrous metals.

14. A composition as claimed in claim 12 wherein the inhibitor (E) inhibits corrosion of ferrous metals.

15. A composition as claimed in claim 12 wherein the inhibitor (E) inhibits corrosion of nonferrous metals.

16. A composition as claimed in claim 13 wherein the corrosion inhibitor (E) is selected from the group consisting of alkali metal nitrites, phosphates, polyphosphates, borates, hydrocarbyl amine [and] *neutralized phosphates;* hydroxy-substituted hydrocarbyl amine neutralized phosphates [and] neutralized hydrocarbyl phosphate esters, neutralized fatty acids, neutralized aromatic carboxylic acids, neutralized hydrocarbyl sulfonates, mixed salt esters of alkylated succinimides, and mixtures of any two or more of these.

17. A composition as claimed in claim 14 wherein the corrosion inhibitor (E) is selected from the group consisting of alkali metal nitrites, phosphates, polyphosphates, borates, hydrocarbyl amine [and] *neutralized phosphates,* hydroxy-substituted hydrocarbyl amine neutralized phosphates. [and ] neutralized hydrocarbyl phosphate esters, neutralized fatty acids, neutralized aromatic carboxylic acids, neutralized hydrocarbyl sulfonates, mixed salt esters of alkylated succinimides, and mixtures of any two or more of these.

18. A composition as claimed in claim 16 wherein the pH of the composition is in the range of about 7.5 to about 9.5.

19. A composition as claimed in claim 17 wherein the pH of the composition is in the range of about 7.5 to about 9.5.

20. A composition as claimed in claim 6 wherein there is also present (F) *an effective amount of* at least one shear stabilizing agent.

21. A composition as claimed in claim 1 wherein there is also present *an effective amount of* at least one (G) polyol of inverse solubility in water.

22. A composition as claimed in claim 2 wherein there is also present *an effective amount of* at least one (G) polyol of inverse solubility in water.

[23. A hydraulic system including as a hydraulic fluid at least one composition as claimed in claim 1.]

[24. A hydraulic system including as a hydraulic fluid at least one composition as claimed in claim 2.]

[25. A hydraulic system including as a hydraulic fluid at least one composition as claimed in claim 11.]

[26. A hydraulic system as claimed in claim 25 wherein the system is a pit prop or powered supporting device useful in underground mining operations.]

[27. A composition as claimed in claim 11 wherein there is also present one or more agents selected from the group consisting of bactericides (H), dyes (J), water softeners (K), odor-masking agents (L), and anti-foamants (M).]

*28. A composition as claimed in claim 11 wherein there is also present one or more bactericides.*

*29. A composition as claimed in claim 11 wherein there is also present one or more dyes.*

*30. A composition as claimed in claim 11 wherein there is also present one or more water softeners.*

*31. A composition as claimed in claim 11 wherein there is also present one or more odor-masking agents.*

*32. A composition as claimed in claim 11 wherein there is also present one or more anti-foamants.*

*33. A hydraulic system including a hydraulic fluid, the improvement wherein the hydraulic fluid is a composition comprising a substantially oil-free aqueous emulsion-free composition of matter useful as a lubricant or functional liquid comprising (A) a major amount of water including up to as much as 99.9 percent by weight of water, (B) a minor but effective amount of at least one substantially water-insoluble, oil-soluble functional additive stably dispersed therein, wherein the functional additive (B) is a sulfur- or chlorosulfur-containing E.P. agent or mixture of two or more of these, (C) a minor but effective amount of at least one substantially water-soluble, liquid organic dispersing agent, said dispersing agent being capable of dissolving said functional additive, and stably dispersing said functional additive in said aqueous composition; and (D) at least one water-soluble polymeric thickener for said aqueous composition, said composition of matter being formed by premixing (B) and (C) and then mixing with the other components.*

*34. A hydraulic system including a hydraulic fluid, the improvement wherein the hydraulic fluid is a substantially oil-free aqueous emulsion-free composition of matter useful as a lubricant or functional liquid comprising (A) a major amount of water including up to as much as 99.9 percent by weight of water, (B) a minor but effective amount of at least one substantially water-insoluble, oil-soluble functional additive stably dispersed therein, wherein the functional additive is a sulfur- or chlorosulfur-containing E.P. agent or mixture of two or more of these, (C) a minor but effective amount of at least one substantially water-soluble, liquid organic dispersing agent, said dispersing agent being capable of dissolving said functional additive, and stably dispersing said functional additive in said aqueous compositions; and (D) at least one water-soluble polymeric thickener for said aqueous composition, wherein the dispersing agent (C) is selected from the group consisting of hydroxyl-substituted hydrocarbon amines, hydrocarbon amines, polyols of 3 to 8 hydroxyls, alkylene glycols, polyoxyalkylene glycols, sulfonated hydrocarbons, and mixtures of two or more of these, said composition of matter being formed by premixing (B) and (C) and then mixing with the other components.*

*35. A hydraulic system as defined in claim 34 wherein said composition also contains (E) an effective amount of at least one inhibitor of corrosion of metal.*

*36. A hydraulic system as claimed in claim 35 wherein said hydraulic system is a pit prop or powered supporting device useful in underground mining operations.*

*37. A substantially oil-free, aqueous emulsion-free composition of matter according to claim 1 wherein said dispersing agent is capable of stably dispersing a minimum of at least 5 grams of said fuhctional additive per liter of water.*

*38. A substantially oil-free, aqueous emulsion-free composition of matter according to claim 37 wherein said dispersing agent is capable of dispersing said functional additive in said aqueous composition in an amount of at least about 10 grams up to about 50 grams per liter of said dispersing agent.*

*39. A substantially oil-free, aqueous emulsion-free composition of matter according to claim 1 wherein said aqueous composition comprises at least in part a micelle dispersion of said functional additives in water, said compositions visually appearing to be true, clear solutions, and on dilution producing insignificant cloudiness.*

*40. A substantially oil-free, aqueous emulsion-free composition of matter according to claim 1 wherein said dispersing agent is capable of stably dispersing said functional additive sufficiently such that the aqueous composition containing said functional additive remains as a homogenous dispersion for at least six hours at 20° C. in the absence of significant agitation.*

* * * * *